United States Patent [19]

Johnson

[11] Patent Number: 5,780,734
[45] Date of Patent: Jul. 14, 1998

[54] TIRE INFLATOR-GAGE WITH SYSTEM PRESSURE RELEASE MEANS

[76] Inventor: Oriz Wickline Johnson, 7086 Butterwood Dr., Cincinnati, Ohio 45241-1035

[21] Appl. No.: 798,557

[22] Filed: Feb. 11, 1997

[51] Int. Cl.⁶ ............................................. B60C 29/00
[52] U.S. Cl. .................................. 73/146.8; 73/146.3
[58] Field of Search ....................... 73/146.2, 146.3, 73/146.8; 137/22.6, 227, 230, 872, 878, 557

[56] References Cited

U.S. PATENT DOCUMENTS

| | | | |
|---|---|---|---|
| 1,259,431 | 3/1918 | Nelson | 137/227 |
| 1,282,613 | 10/1918 | Miliea | 137/227 |
| 1,622,688 | 3/1927 | Van Riper | 73/146.2 |
| 1,753,118 | 4/1930 | Johansson et al. | 137/227 |
| 1,768,275 | 6/1930 | Urton | 137/227 |
| 3,230,968 | 1/1966 | Struby | 73/146.8 |
| 3,869,908 | 3/1975 | Driendl | 73/146.2 |
| 3,969,936 | 7/1976 | Lindsay | 73/146.8 |
| 4,658,869 | 4/1987 | Soon-Fu | 73/146.8 |
| 4,901,747 | 2/1990 | Yabor | 73/146.8 |

*Primary Examiner*—Ronald L. Biegel

[57] ABSTRACT

A hand-held automobile tire inflator valve-gage assembly having means to release undesired system pressure when not being applied, thus reducing compressor stress and power consumption.

7 Claims, 1 Drawing Sheet

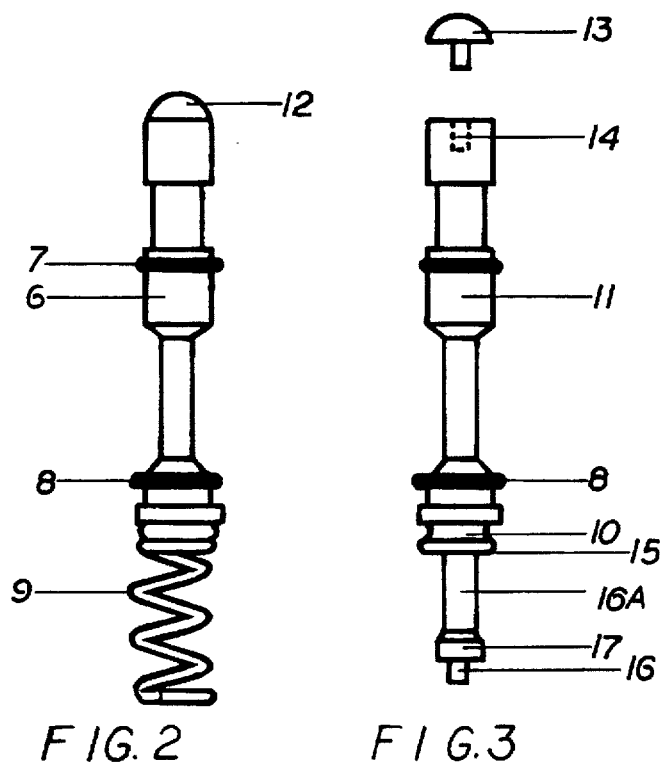
FIG. 2
FIG. 3
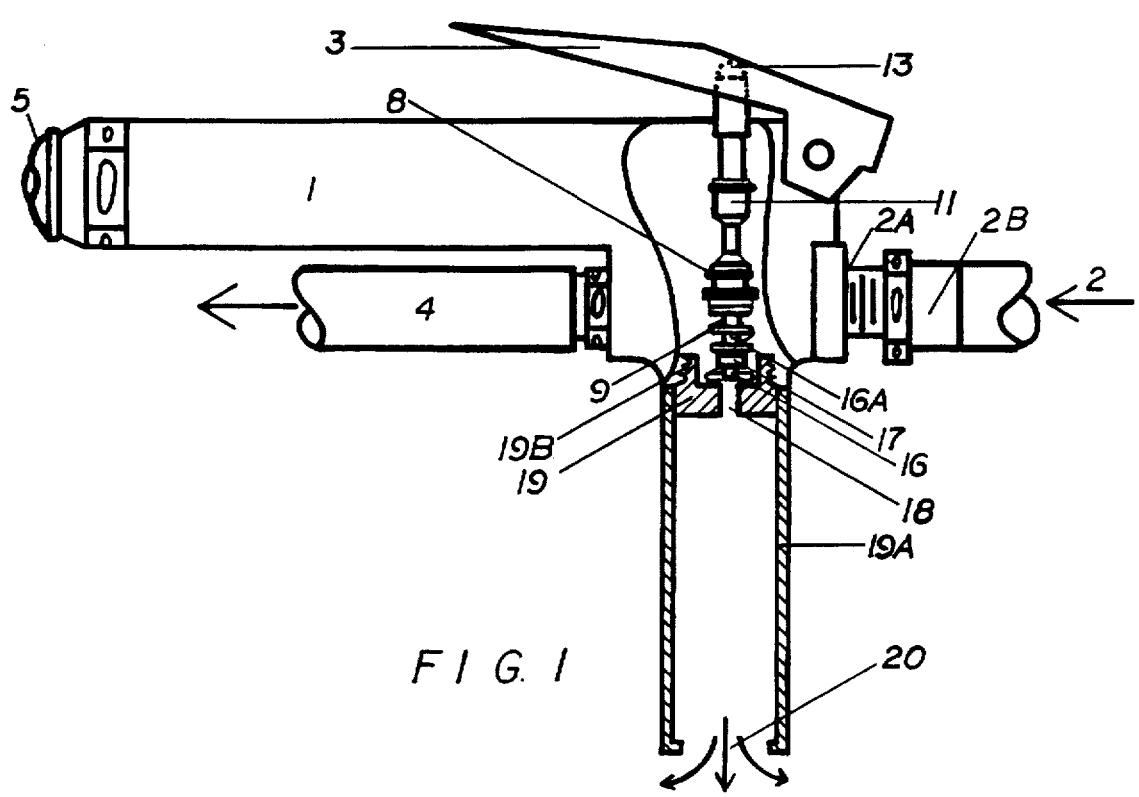
FIG. 1

TIRE INFLATOR-GAGE WITH SYSTEM PRESSURE RELEASE MEANS

SUMMARY OF THE INVENTION

Shortly after the invention of the pneumatic automobile tire, service stations, such as they were, installed air compressors and air tanks with an air hose to service their customers. The hose had a spring loaded valve at its end which shut off the air flow when the hose was not actually connected to the tire valve stem. The air compressor was controlled by a pressure switch which, when the air pressure in the tank dropped to a certain level, brought on the compressor to pump up the task again. This simple technique remains virtually unchanged to this day, nearly a hundred years later.

Comes now, however; the energy crisis of the early 1970's and oil companies converted most of their pumps and operation to "self service". Additionally, in the mid 1980's self service air machines appeared, each with its own small compressor in lieu of a tank, but with the same type of hose end shut off valve, i.e. one that keeps air from escaping from the hose unless the hose valve is attached to the tire valve. This type of self-service valve also includes a convenience gage mechanism with a gage handle to enable the user to gage and/or inflate the tire. The gage-valve assembly is now known through out the industry as simply a "gage" and will be so in the rest of this application.

Apparently hose gage manufactures have not entirely recognized the different needs of the two techniques and/or there was not sufficient demand initially to invent a different type of valve for the embryonic air machine needs. Now there are in the order of 100,000 air machines in operation and each one is presented a problem created by these traditional hose valves, to wit the small compressor runs fully loaded for nearly four minutes when only about one minute is normally required to service the deflated tire. This needless loaded running time imposes unwanted stress on the compressor and increases energy consumption to no purpose.

What's needed is a traditional hose gage valve that enables the pressure to bleed off when the tire is not actually being inflated, thus markedly reducing the energy required and the stress demands on the compressor the proposed invention does just that i.e., when the compressor starts pumping, the compressed air moves down the hose to the closed conventional gage but now is bled off thru a pressure release escape port. When the gage is applied to the tire valve stem and the gage handle depressed, a piston actuated by the depressed handle seals off the release port and all available air pressure is applied to the tire. When the spring loaded handle is relaxed the release port is re-opened and the hose pressure is again released to the atmosphere. Only the air pressure actually required to do the inflation is compressed to the high pressure. Moreover, the operation of the release port in the invention does not interfere with the pressure reading function of the gage.

In its most elemental form, my invention is simply an orifice strategically positioned through the body of the conventional air hose gage and a plug for the orifice inserted or removed by the handle action of the gage. There are a number of possible locations in the gage body for the orifice, but to serve its primary pressure relief function, to also allow for service access for the various valve components, the convenience of the customer and to discourage thievery the particular configuration submitted is believed the best application of the concepts involved.

DESCRIPTION OF THE DRAWINGS

FIG. 1. A cutaway elevation of the conventional air gage 1 modified to accommodate the invention, showing the re-configured valve piston 11 with compression spring 9 and the release port assembly 19 with extension tube 19A.

FIG. 2. An elevation of a conventional air gage valve piston, complete with O-rings 7 & 8 and compression spring 9 captured in spring retainer groove.

FIG. 3. An elevation of the valve piston as modified for the invention, showing the stainless steel wear-surface cap 13, the extension of the bottom extremity to point 16 and the depth stop 17. This view also shows the conventional spring retainer groove 10.

PREFERRED EMBODIMENT

FIG. 1: Conventional hand-held tire inflator gage 1 having a multi-ported internal air distribution section, not shown, having an air flow stop valve normally sealed by O-ring 8 on piston 6 or 11 and having air hose input at 2. When gage handle 3 is depressed, air exits nozzle hose 4 to enter tire, not shown. Pressure indicator 5 moves in or out to balance the pressure in the tire and displays the tire pressure to the user.

FIG. 2 and 3: Conventional valve piston 6 has two "O-rings" 7 and 8, compression spring 9 captured in spring retainer groove 10.

FIG. 3: Proposed valve piston 11 is identical to conventional valve 6 except bearing surface 12 has a replaceable tip 13 of hard metal, preferably stainless steel, press fit into cavity 14. The shaft 16a from point 15 is extended to terminate in a blunt end 16 with a depth stop at 17.

FIG. 1: Shows a conventional gage assembly modified to accommodate the invention, to wit the extended valve piston is inserted into the gage in lieu of the conventional piston and a pressure release port assembly 19 is screwed into the gage body in lieu of the conventional valve piston access nut, not shown.

When air pressure is applied to the modified gage assembly, as it is any time the compressor is operating air enters at 2 but immediately escapes without resistance around valve piston 11, through return spring 9 and out pressure release port 18. The escaping air stream is diffused and slowed in extension tube 19A to finally exit opening 20 to atmosphere and away from user's hand.

When air is to be actually applied to the tire, the nozzle hose 4 is positioned on the tire valve stem, not shown, and the gage handle depressed. As the handle is depressed it bears down on the top bearing surface 13 of the valve piston forcing it, against the bias of the return spring into the conventional gage multi-ported air distribution section, not shown depressing piston O-ring 8 away to unseal the air flow stop valve, thus directing the air stream to exit hose 4 to the tire in the conventional fashion. During the tire inflating activity, however, the pressure release port 18 must be closed; therefore, as piston 11 is depressed by the gage handle, the blunt end 16 enters the pressure release port, immediately stopping the escaping air. To accommodate the additional piston travel required for proper inflation operation, the piston end 16 penetrates into the release port until stop 17 bottoms out, further insuring a non-leak seal. When the handle is released, even momentarily, the bias of the return spring 9 presses up on valve piston 11 lifting it out of release port 18 and unneeded pressure is again released to the atmosphere Conventional valve pistons are generally made of brass which, after contact with the underside of the gage handle the top of the piston gradually wears down such that a worn valve piston cannot be depressed by the gage handle as deeply as a new piston. The conventional gage has a wide tolerance for worn pistons although they must be replaced when the wear exceeds this tolerance In the proposed scheme it is essential that the piston always be depressed to the same depth, to wit, to the point the stop 17 bottoms out. To insure immunity to top wear, the tip of the valve piston has a stainless steel cap. The entire piston could be constructed of stainless but the cap technique is cheaper and will last as long as the gage itself. The gages do incur considerable damage from weather, being dropped or thrown down and being run over by cars and must themselves be replaced from time to time. It is intended that in large measure the pressure release components of the proposed invention, if used to modify an off-the-shelf gage, be moved from gage to gage.

While the is in hand, the escaping air stream could be a distraction to the user. The stainless steel extension tube 19A, however, slows the stream and releases it sufficiently away from the user's hand as to be no distraction.

The conjunction of the stainless extension tube and the chrome gage body is virtually invisible and having no wrench lands, gives no clue to the mindless vandal that the tube can be removed.

While the preferred embodiment described above is believed to be the most appropriate embodiment of the concepts involved, it is also possible to reconfigure the conventional piston to achieve the same "flow thru" results, such as placing the high pressure release port on the side of the gage body with a protrusion on the side of the piston valve which slides up or down to close, or open the port as the handle is depressed or relaxed.

Additionally it is certainly possible to provide an accessory to the conventional gage to be fitted between the gage and the feeding air hose from the compressor, the accessory having a normally-open high pressure release port, with spring-return control piston, rising vertically. The piston linked to a reconfigured back end of the gage handle, not shown, such that when the front end of the gage handle is depressed, the back end of the handle rises, lifting the piston to close the high pressure release port. When the depressed handle is relaxed, the return spring returns the piston to its open-port position.

The sine qua non of this patent application is the opening and closing of a normally-open high pressure release port and controlled specifically thru interaction with the gage handle, thus both of these embodiments, as well as any other which involve interaction with the gage handle is anticipated by claim 7 to follow.

I claim:

1. A device for reducing high air pressure in compressed air systems comprising improvements to a conventional hand-held tire inflater gage for use in said compressed air systems, wherein the improvements to said gage comprise:

an air pressure release port 18 being spring-biased to an open position wherein said pressure release port in the open position releases pressurized air from an interior high pressure multi-ported section of the gage thru said pressure release port assembly 19 to atmosphere; and, pressure release control means 16 for controlling the release of high air pressure;

whereby high air pressure levels are automatically released from the compressed air system when the inflater gage is not in use.

2. An apparatus as recited in claim 1, wherein the normally-open pressure release port 18 releases air through the bottom of the gage into an open-ended enclosure 19A.

3. An apparatus as recited in claim 2, wherein the open-ended enclosure comprises a tube having an inside diameter greater than the diameter of the release port 18, and a length sufficient that the open end discharges air away from user's hand.

4. A device for reducing high air pressure in compressed air systems comprising improvements to a conventional hand-held tire inflater gage for use in said compressed air systems, wherein the improvements to said device comprise:

pressure release means 19 for releasing high air pressure from the compressed air system through the tire inflator to atmosphere, whereby high air pressure levels are automatically released from the compressed air system when the inflater is not in use; and a pressure release control for controlling release of high air pressure when the tire inflator is in use, comprising a valve piston 11 mechanically interacting with a gage handle 3 such that in the tire inflating position the underside of the gage handle applies a force to a bearing surface 13 of the valve piston 11 thereby pressing the opposite end 16 of the valve piston 11 against the air pressure release port to close the port.

5. An apparatus as recited in claim 4, wherein the improved valve piston 11 comprises a valve piston having geometry, dimensions and O-rings identical to conventional gage valve piston 6 from the uppermost extremity of the piston to 15, the lowermost extremity of return spring retainer groove 10, said improved valve piston 11 having an in-line extension 16A of the piston shaft below the return spring retainer groove; and the uppermost extremity of the piston having an extremely hard, wear-resistant, bearing-surface tip 13.

6. An apparatus as recited in claim 5, wherein the in-line extension 16A of the piston shaft below the bottom of the return spring retainer groove 10 has a penetration depth stop 17 comprising a portion of the extended shaft having a greater diameter than adjacent portions, lowest extremity of the depth stop precisely positioned at a pre-determined distance from the uppermost extremity of the valve piston, the portion of shaft 16 immediately below the depth stop having a pre-determined length and a predetermined diameter to snugly fit into the normally-open air pressure release port 18.

7. An apparatus as recited in claim 4, wherein re-opening means for re-opening the normally-open air pressure release port 18 when user's hand is relaxed, comprises a compression spring 9, the upper extremity of which engages the return spring retainer groove 10 of the valve piston, biased, when the user's hand is relaxed, to raise the lower extremity 16 of the valve piston 11 out of the air pressure release port 18, to raise the valve piston lower O-ring 8 into position to re-seal the air flow stop valve, and to raise the wear-resistant tip 13 of the valve piston to press the underside of the handle 3 back up to its stand-by position.

* * * * *